(12) United States Patent
Kawasome

(10) Patent No.: US 7,777,720 B2
(45) Date of Patent: Aug. 17, 2010

(54) INPUT SYSTEM, PROGRAM, AND RECORDING MEDIUM

(75) Inventor: Toshiki Kawasome, Saitama-ken (JP)

(73) Assignee: Wacom Co., Ltd., Saitama-Ken (JP)

( * ) Notice: Subject to any disclaimer, the term of this patent is extended or adjusted under 35 U.S.C. 154(b) by 888 days.

(21) Appl. No.: 11/644,963

(22) Filed: Dec. 26, 2006

(65) Prior Publication Data

US 2007/0103435 A1 May 10, 2007

Related U.S. Application Data

(63) Continuation of application No. 10/073,929, filed on Feb. 14, 2002, now Pat. No. 7,173,603.

(30) Foreign Application Priority Data

Feb. 15, 2001 (JP) .............................. 2001-039091

(51) Int. Cl.
*G09G 5/00* (2006.01)
(52) U.S. Cl. ...................................... 345/156; 345/168
(58) Field of Classification Search ......... 345/156–173; 715/842; 178/18.01–18.07, 19.01–19.07
See application file for complete search history.

(56) References Cited

U.S. PATENT DOCUMENTS

| 5,610,631 | A | * | 3/1997 | Bouton et al. ............... 345/161 |
| 5,731,801 | A | * | 3/1998 | Fukuzaki ..................... 715/842 |
| 5,798,752 | A | * | 8/1998 | Buxton et al. ............... 715/863 |
| 5,865,546 | A | * | 2/1999 | Ganthier et al. ............. 400/489 |
| 5,914,701 | A | * | 6/1999 | Gersheneld et al. ......... 345/156 |
| 5,929,844 | A | * | 7/1999 | Barnes ....................... 345/156 |
| 6,611,258 | B1 | * | 8/2003 | Tanaka et al. ............... 345/179 |
| 6,963,935 | B1 | * | 11/2005 | Young et al. ................. 710/29 |
| 7,176,908 | B2 | * | 2/2007 | Matsubara et al. .......... 345/204 |
| 2001/0003449 | A1 | * | 6/2001 | Kimura ....................... 345/157 |

* cited by examiner

*Primary Examiner*—Nitin Patel
(74) *Attorney, Agent, or Firm*—Berenato & White, LLC

(57) ABSTRACT

An input system for a computer includes a first input device, such as a mouse or a tablet, and a second input device differing from the first input device. The first input device specifies a position on a display screen, which is connected to a computer for executing an application program and for displaying a processing object area of the application program on the display screen. An instruction set instructs a change in a display state of the processing object area on the display screen in response to an operation of the second input device. The first input device is operated with the operator's favored hand, while the second input device is operated with the operator's non-favored hand. Therefore, both hands are effectively used to improve operation efficiency.

9 Claims, 9 Drawing Sheets

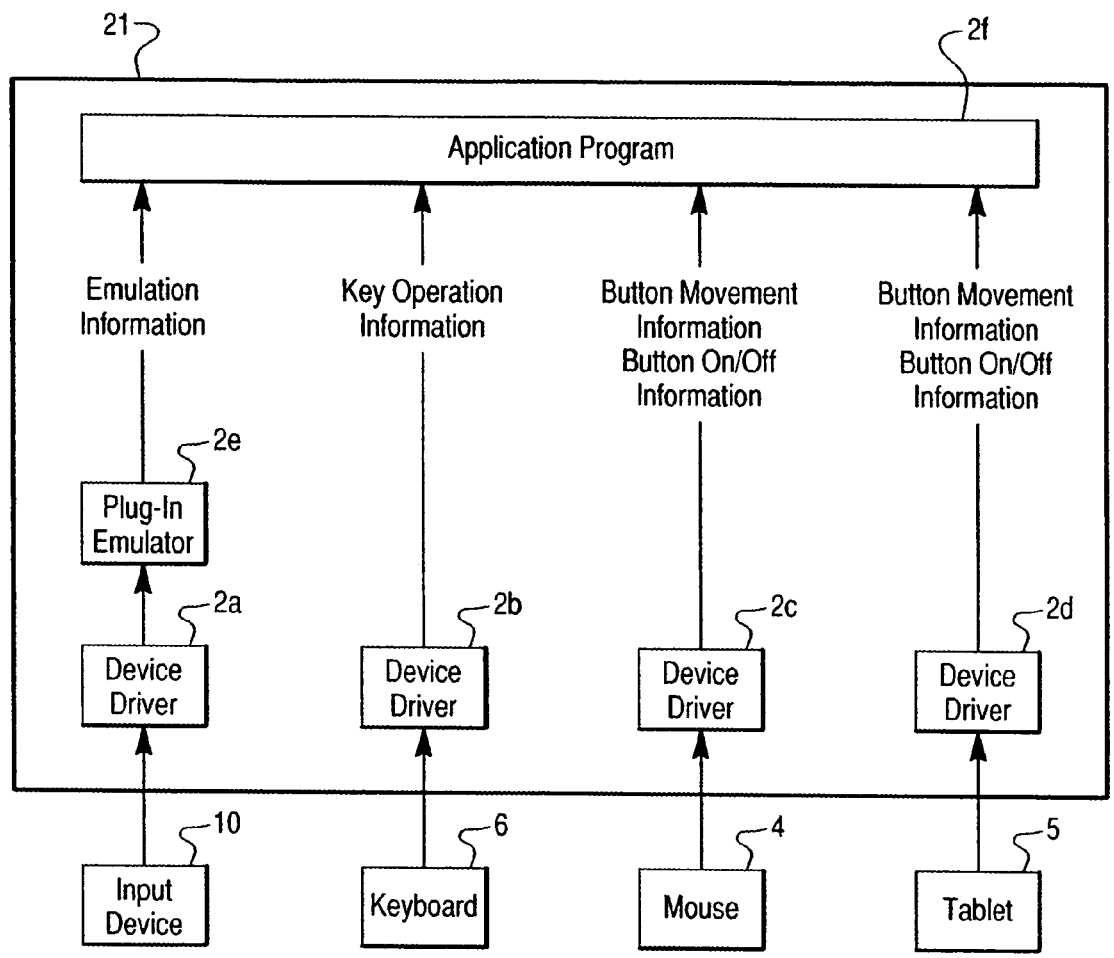

Fig. 6

| Key Switch | Label | Instruction Signal |
|---|---|---|
| Key 13a | Store | Keyboard "Ctrl" + "S" |
| Key 13b | Select All | Keyboard "Ctrl" + "A" |
| Key 13c | Copy | Keyboard "Ctrl" + "C" |
| Key 13d | Cut | Keyboard "Ctrl" + "X" |
| Key 13e | Paste | Keyboard "Ctrl" + "Y" |
| Key 13f | Undo | Keyboard "Ctrl" + "Z" |
| Key 13g | Font Setting | Keyboard "Ctrl" + "D" |
| Key 13h | Create Newly | Keyboard "Ctrl" + "N" |
| Key 13i | Switch Display | Keyboard "Alt" + "Esc" |
| Key 13j | On/Off | On/Off Switching Of Input Device |

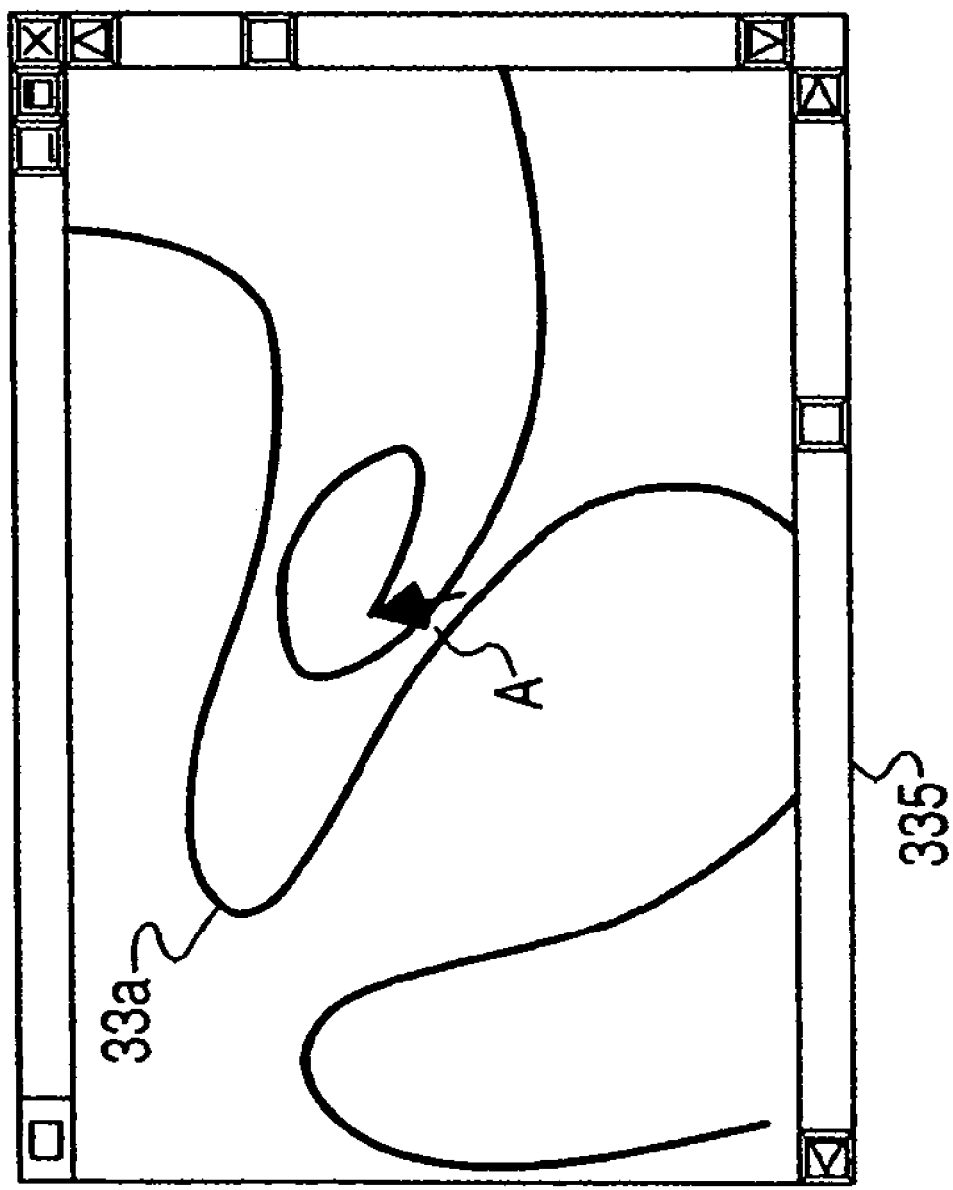

INPUT SYSTEM, PROGRAM, AND RECORDING MEDIUM

CROSS-REFERENCE TO RELATED APPLICATION AND CLAIM TO PRIORITY

This application is a continuation of application Ser. No. 10/073,929, filed Feb. 14, 2002 now U.S. Pat. No. 7,173,603, the disclosure of which is incorporated herein by reference and to which priority is claimed under 35 U.S.C. §120.

BACKGROUND OF THE INVENTION

1. Field of the Invention

The present invention relates to an input system comprising a first input device and a second input device differing from the first input device, connected to a computer for executing an application program and for displaying a processing object area of the application program on the display screen. This invention also relates to a method for instructing a change in a display state of a processing object area of an application program on a display screen using the input system. Further, this invention relates to a recording medium having the application program stored thereon.

2. Description of the Related Art

Pointing devices connected to computers, such as mice and tablets, are widely used as input devices for specifying a position on a display screen of the computer. Many input operations which are performed by using a keyboard in a conventional computer can also be performed by using pointing devices in combination with an Operating System (OS) and a Graphical User Interface (GUI).

However, in some keyboard operations, a plurality of keys must be pressed simultaneously in order to perform special instructions. For example, in application programs executed by a computer, settings are made which require a plurality of specific keys to be operated simultaneously in order to perform a specific process. Such settings make it possible to perform a specific process with one operation, commonly known as a "shortcut key".

Shortcut key operations can be quickly performed and are convenient when the user is operating the keyboard with both hands. However, such operations are difficult to perform by using pointing devices alone, and pointing devices must often be used in conjunction with keyboard operation.

For example, in a computer application program for performing a drawing process, drawing operations are performed with the pointing device, while the keyboard is used to edit the file, switch the screen, etc. In such a case, both the pointing device and the keyboard are generally operated with the operator's favored hand. This is bothersome given the operator must move his favored hand away from the pointing device in order to operate the keyboard. Further, when a complex operation such as a shortcut key is performed, it is difficult for the operator to handle the keyboard with his non-favored hand. Operation is inefficient if the operator only uses his favored hand, leaving the other hand idle.

SUMMARY OF THE INVENTION

An objective of the present invention is to allow operators to efficiently perform computer operations using their non-favored hand with simple manipulations, while simultaneously operating a pointing device with their favored hand.

According to one aspect of the present invention, an input system is provided (FIG. 1) comprising: a first input device, such as a mouse 4 or a tablet 5, for specifying a position on a display screen 3, which is connected to a computer 2 for executing an application program 2f and for displaying a processing object area 2g of the application program on the display screen; a second input device 10 differing from the first input device; and an instruction set (a CPU 21 for executing a plug-in emulator 2e shown in FIG. 3) for instructing a change in a display state of the processing object area on the display screen in response to an operation of the second input device.

Examples of the first input device include pointing devices such as a mouse, a trackball, or a touch pad, and a pen tablet. Of course, any known pointing device may be used. Examples of application programs include general application programs, such as drawing software and document creation software, or application programs for realizing some of the functions of the operating system.

Examples of the second input device, which differs from the first input device, include a scroll wheel, a trackball, a touch pad, a key switch, or any other known input device. Note that the computer may be configured such that, in addition to the first and second input devices, other well-known input devices, such as keyboards, may also be connected as third and/or fourth input devices.

According to the present invention, the input system comprising a first input device for specifying a position on a display screen is connected to a computer for executing an application program, and for displaying a processing object area of the application program on a display screen. An instruction set instructs a change in a display state of the processing object area of the application program on the display screen in response to an operation in a second input device differing from the first input device. Thus, the display state of the processing object area is changed on the display screen while the application program is being executed.

Therefore, it is possible for an operator to specify a position on the display screen by operating the first input device with one hand, while changing the display state of the processing object area on the display screen by operating the second input device with the other hand. This makes it possible to effectively use both hands in cooperation and to efficiently perform operations.

The display state of the processing object area can be changed with simple manipulations of the operator's non-favored hand by using the second input device. Thus, it is possible to assist an operation performed by the first input device with the second input device.

Operation efficiency is greatly decreased if the first input device performs both an operation of specifying a position on the display screen, and an operation for changing the display state of the processing object area. Different operation contents must be switched and performed all with the first input device. The input system of the present invention increases operation efficiency since different operation contents are performed with both hands.

In addition, the second input device can be used at a desired position away from the first input device. The ease of operation is improved considerably, and operations can be performed smoothly while using both hands in a natural posture.

In one form of the input system of the present invention, the instruction set instructs a change of a relative position of the processing object area displayed on the display screen in response to an operation of the second input device.

According to the invention, the application program may be instructed to change the relative position of the processing object area on the display screen in response to an operation of the second input device. For example, if the size of the processing object area is equal to or greater than the size of the display screen, when the relative position of the processing object area with respect to the display screen is changed, the processing object area is moved with respect to the display screen, and the displayed range is moved. The processing object area is also moved on the display screen if the processing object area is smaller than the display screen.

Therefore, it is possible for the operator to simultaneously perform an operation of specifying a position on the display screen and an operation of changing the relative position of the processing object area with respect to the display screen by using both the first and second input devices.

Conventionally, if the relative position of the processing object area with respect to the display screen is changed, the object for an operation by the first input device is moved, and the operator is forced to perform a complex operation. According to the present invention, the first input device is operated with one hand, while the other hand supplements this operation. Operations are performed efficiently by using both hands in cooperation.

In a second form of the input system of the present invention, the instruction set instructs a change of a display magnification ratio of the processing object area displayed on the display screen in response to an operation of the second input device. The instruction set generates a signal for instructing an application program to change the display magnification ratio of the processing object area displayed on the display screen in response to an operation in the second input device. The processing object area displayed on the display screen may be enlarged or reduced.

Therefore, it is possible for the operator to use both hands to simultaneously perform operations of specifying a position on the display screen using the first input device and changing the display magnification ratio of the processing object area on the display screen using the second input device.

When the display magnification ratio on the display screen is changed, the processing object area being displayed is enlarged or reduced. In response, the range displayed within the processing object area is varied. Therefore, a display magnification ratio of an operation object may be changed with one hand using the second input device, while the position on the display screen is specified using the first input device, which is operated with the other hand. Operation efficiency and ease of operation are again improved considerably.

In a third form of the input system of the present invention, the instruction set instructs a change of display size of an object contained within the processing object area in response to an operation of the second input device. (For example, a character object 201 or 202 shown in FIGS. 9A and 9B).

According to the present invention, the instruction set instructs a change of the display size of an object contained in the processing object area in response to an operation of the second input device. Therefore, an operation of the second input device can change the display size of objects such as characters displayed in the processing object area. As a result, complicated processes which conventionally require a complex setting operation can be performed with simple and intuitive manipulations.

In a fourth form of the input system of the present invention, the instruction set instructs an editing process for the processing object area in response to an operation of the second input device. The editing process includes functions such as cutting, copying, and pasting, related to an object within the processing object area. The editing process also includes functions such as storing and updating the state of the processing object area.

Therefore, in addition to instructing a change of the display state of the processing object area, or some other process herein, operation of the second input device may also instruct an editing process for the processing object area. As a result of such an operation in the second input device, editing processes may be performed, such as cutting, copying, pasting and storage/updating.

Conventionally, an editing process for the processing object area is often performed by key operations on the keyboard. Some editing processes require the operation of a plurality of keys on the keyboard at the same time. This is bothersome. According to the present invention, by operating the first input device with one hand while the second input device is operated with the other hand, a position on the display screen can be specified, and an editing process can be performed simultaneously, again improving operation efficiency. In addition, the effort required to pass the input device from one hand to the other is eliminated, thereby improving the ease of operation. Furthermore, since the keyboard is unnecessary, desk space is used more efficiently.

In another form of the input system of the present invention, the instruction set generates a signal corresponding to an application program executed by the computer, in response to an operation of the second input device. Specifically, the instruction set generates a signal compatible with the application program executed by the computer. The signal provides an instruction corresponding to an operation in the second input device.

In a case where a plurality of different application programs can be executed by the computer, the instruction set generates a signal compatible with the application program which is being executed. Since a signal compatible with the application program executed by the computer is generated, the application program is not limited. Thus, the claimed input system can be widely used with general application programs. For this reason, an expensive application program for use with the claimed input system is not needed. Therefore, a versatile and economical input system is provided without excessive cost to the operator.

According to a second aspect of the present invention, a program is provided (plug-in emulator 2e) which causes a computer 2, to which a first input device (a mouse 4 or tablet 5) for specifying a position on a display screen, and a second input device 10 differing from the first input device, are connected. Operation of the second input device changes the display state of the processing object area on the display screen. The computer executes an application program in accordance with instructions input from the first and second input devices and displays the processing object area of the application program (2f) on the display screen.

Examples of the first input device include pointing devices such as a mouse, a trackball, a touch pad, or a pen tablet. Other well-known input devices can also be used. Application programs include general application programs, such as drawing/image editing software and document creation software, as well as application programs for realizing some of the functions of the operating system. Examples of the second input device include an input device such as a scroll wheel, a trackball, a touch pad, or a key switch. Other well-known input devices may also be used for the second input device. Furthermore, the construction may be formed in such a way that, in addition to the above-described first and second input devices, a well-known input device, such as a keyboard, is connected to the computer as a third or fourth input device.

According to the present invention, a first input device for specifying a position on a display screen, and a second input device differing from the first input device, are connected to a computer. The computer executes an application program in accordance with instructions input from the first and second input devices, and displays the processing object area of the application program on the display screen. The display state of the processing object area on the display screen is changed in response to an operation of the second input device. Therefore, processes such as enlargement, reduction, or movement are performed on the processing object area of the application program on the display screen through use of the second input device.

It is possible for the operator to change the display state of the processing object area on the display screen by operating the second input device with one hand, while specifying a position on the display screen by operating the first input device with the other hand. As a result, both hands are effectively used in cooperation, thereby improving operation efficiency. Also, by using the second input device, the display state of the processing object area can be varied with a simple operation. Therefore, it is possible to assist operations performed by the first input device.

Conventionally, if both the operation of specifying a position on the display screen and the operation for the processing object area are performed using only the first input device, different operation contents must be switched and performed, thereby decreasing operation efficiency. However, the claimed invention provides for the performance of different operation contents with both hands in a shared manner. Operation efficiency and ease of operation are improved considerably.

In one form of the program of the present invention, the program performs a display state changing process in which the relative position of the processing object area with respect to the display screen is changed in response to an operation of the second input device.

According to the present invention, in the display state changing process, the computer changes the relative position of the processing object area with respect to the display screen in response to an operation of the second input device. For example, when the size of the processing object area is equal to or larger than the size of the display screen, the relative position of the processing object area with respect to the display screen is changed. The processing object area is moved with respect to the display screen, and the range displayed on the display screen is moved. When the size of the processing object area is smaller than the size of the display screen, the processing object area is moved on the display screen.

Therefore, it is possible for the operator to simultaneously perform both operations of specifying a position on the display screen by using the first input device, and changing the relative position of the processing object area with respect to the display screen by using the second input device. Conventionally, if the relative position of the processing object area with respect to the display screen is changed, the object of the application by the first input device is moved. Then, the operator is forced to perform a complex operation.

However, according to the present invention, operation of the first input device with one hand is supplemented by operation of the second input device with the other hand. Therefore, it is possible to efficiently perform an operation with both hands and thereby improve operation efficiency.

In one form of the program of the present invention, the program performs a display state changing process which changes the display magnification ratio of the processing object area displayed on the display screen in response to an operation in the second input device. The display magnification ratio of the processing object area displayed on the display screen may be changed by a computer in response to an operation in the second input device. The processing object area displayed on the display screen is enlarged or reduced.

By using both hands, it is possible for the operator to simultaneously perform the operation of specifying a position on the display screen by using the first input device and the operation of changing the display magnification ratio of the processing object area on the display screen by using the second input device.

When the display magnification ratio on the display screen is changed, the processing object area being displayed may be enlarged or reduced. In response to this, the displayed range in the processing object area is varied. Therefore, while a position on the display screen of the processing object is specified by the first input device with one hand, the display magnification ratio of the processing object may be changed by the second input device using the other hand. Both hands are effectively used, improving operation efficiency and ease of operation.

In another form of the program of the present invention, the program performs a display state changing process in which the display size of an object (a character object 201 or 202 shown in FIGS. 9A and 9B) contained in the processing object area is changed in response to an operation in the second input device.

According to the present invention, in the display state changing process, the display size of an object contained in the processing object area may be changed by a computer in response to an operation in the second input device.

Therefore, by operating the second input device, a process such as the display size of an object contained in the processing object area is performed. Conventionally, such complicated processes require a complex setting operation. However, the claimed invention provides for changing the display state with simple and intuitive manipulations.

In another form of the program of the present invention, the program performs a display state changing process in which an editing process in the processing object area is performed in response to an operation in the second input device.

The editing process for the processing object area includes an editing process related to an object within the processing object area, such as cutting, copying, and pasting, as well as an editing process related to the processing object area itself, such as storing and updating the state of the processing object area.

According to the present invention, in addition to the display state changing process, an editing process for the processing object area may be performed in response to an operation of the second input device.

Conventionally, an editing process for the processing object area is often performed by key operations on the keyboard. Some editing processes require simultaneous operation of a plurality of keys on the keyboard. This is bothersome. According to the present invention, the necessity to use the keyboard in an editing process is eliminated. The operator uses the first and second input devices with both hands simultaneously. A position on the display screen can be specified, and an editing process can be quickly performed continuously, thereby improving operation efficiency.

In another form of the program of the present invention, in the display state changing process, a process of generating a signal corresponding to the application program executed by the computer in response to an operation in the second input device is performed. As a signal for causing a process corresponding to the operation in the second input device to be executed by the computer is generated, a signal compatible with the application program executed by the computer is generated.

In a case where a plurality of different application programs can be executed in the computer, a signal compatible with the application program being executed is generated in the display state changing process. Therefore, the application program is not limited, and may be widely used for general application programs. Therefore, the need for an expensive application program for the claimed invention is eliminated. Furthermore, an operator may use both hands effectively to perform an input operation in an application program which the operator is accustomed to using, thereby improving operation efficiency considerably.

According to another aspect of the present invention, a recording medium is provided with a program stored thereon. By using the recording medium of the present invention in a computer, the same advantages as those offered by other aspects of the invention, as described above, are achieved.

Further objects, features and advantages of the present invention are apparent from the following descriptions of the preferred embodiments, in addition to the attached drawings.

BRIEF DESCRIPTION OF THE DRAWINGS

FIG. 3 is a schematic diagram showing the operation of the input system 1 shown in FIG. 1.

FIG. 4A depicts a processing object area 2g by the application program 2f and a display area 2h displayed on a display device 3 within the processing object area 2g; and FIG. 4B depicts a drawing processing screen 31 on which the display area 2h shown in FIG. 4A is displayed.

FIG. 6 is a table showing examples of instruction signals generated in such a manner as to correspond to the keys provided in a key switch section 13 in the process of step S8 shown in FIG. 5.

FIG. 7A depicts a drawing processing screen 321; FIG. 7B depicts a drawing processing screen 322; FIG. 7C depicts a drawing processing screen 323; and FIG. 7D depicts a drawing processing screen 324.

FIGS. 8A, 8B, 8C, 8D, and 8E, depict examples of a screen displayed on the display device 3 in such a manner as to correspond to a series of input operations in the input system 1 shown in FIG. 1. FIG. 8A depicts a drawing processing screen 331; FIG. 8B depicts a drawing processing screen 332; FIG. 8C depicts a drawing processing screen 333; FIG. 8D depicts a drawing processing screen 334; and FIG. 8E depicts a drawing processing screen 335.

FIG. 9A depicts a browser screen 34 as an example of the display screen in the initial state; and FIG. 9B depicts a browser screen 35 on which the display size of character objects is changed.

DESCRIPTION OF THE PREFERRED EMBODIMENTS

Figure 1:
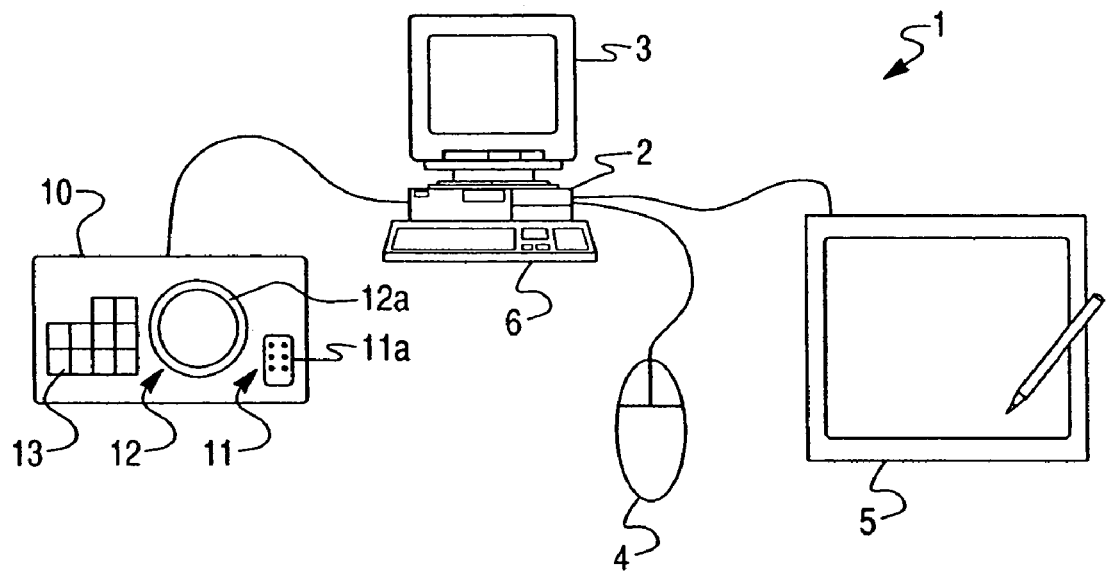
FIG. 1 depicts the configuration of an input system 1 according to a first embodiment of the present invention.

FIG. 1 depicts the configuration of an input system 1 according to a first embodiment of the present invention. The construction of the top surface of an input device 10 is shown.

As shown in FIG. 1, the input system 1 is constructed in such a way that the input device 10 is connected to a computer 2 to which a display device 3, a mouse 4, a tablet 5, and a keyboard 6 are also connected. The mouse 4, the tablet 5, the keyboard 6, and the input device 10 are each connected to the computer 2 via interfaces conforming to standards, such as USB (Universal Serial Bus), a serial interface, PS/2, etc. Usually, the mouse 4 and the tablet 5 are operated with the operator's favored hand, and the keyboard 6 is operated with both hands of the operator.

The mouse 4 and the tablet 5 may be connected to the computer 2 at the same time, but only one of them may be exclusively connected to the computer 2.

The display device 3 has a display screen, such as a CRT (Cathode Ray Tube) or an LCD (Liquid Crystal Display), and displays various screens on the basis of display information input from a CPU 21 of the computer 2 (described below). The display device 3 is connected to the computer 2 via interfaces conforming to standards such as D-Sub, BNC (British National Connector), DVI (Digital Visual Interface), and DFP (Digital Flat Panel). A signal output from the CPU 21 to the display device 3 may be either an analog signal or a digital signal.

The mouse 4 is an input device which is moved about a flat surface by an operation of the operator. When the mouse 4 is being operated by the operator, an operation signal indicating the direction of the movement and the amount of the movement thereof is generated. This signal is output to the CPU 21 of the computer 2 (described below). The mouse 4 has one or more buttons. When a button is pressed, an operation signal corresponding to the operated button is generated and is output to the CPU 21.

Examples of the mouse 4 include a mechanical mouse having, on the bottom of the main body thereof, a ball and a rotary encoder (rotation detector) for detecting the direction of the rotation and the degree of the rotation of the ball, or an optical mouse for detecting the direction of the movement and the amount of the movement by causing an LED (Light Emitting Diode) provided on the bottom of the main body to emit light and receive the reflected light by a photodetector (light detection mechanism). In addition, other well-known mice can be used.

The tablet 5 includes a pen-type position indicator for specifying a position, and a flat plate-shaped coordinate detector for detecting a position indicated by this position indicator. When the position indicator is moved on the coordinate detector by an operation of the operator and an arbitrary position is indicated, an operation signal indicating the position indicated by the coordinate indicator is generated and is output to the CPU 21 of the computer 2 (described below). The coordinate indicator has a button, whereby an operation signal indicating a button operation is generated in such a manner as to correspond to the operation of the button and is output to the CPU 21.

The keyboard 6 has a plurality of key switches, such as numeric keys for numerals 0 to 9, character keys for letters of the alphabet, and various function keys such as an "Esc" key (Escape key), an "Alt" key (Alternate key), and a "Ctrl" key (Control key). When any one of the keys is pressed by the operator, the keyboard 6 generates an operation signal indicating the operated key, and outputs the signal to the CPU 21 of the computer 2 (described below). The types and number of keys on the keyboard 6 are arbitrary.

The input device 10 comprises a wheel operation section 11, a ball operation section 12, and a key switch section 13. The wheel operation section 11 comprises a wheel 11a in the shape of a ring which is rotatably fixed to the main unit of the input device 10, and a rotation detection section (not shown) for detecting the rotation of the wheel 11a. Then, each time the wheel operation section 11 is operated by the operator, the input device 10 generates an operation signal indicating the direction of the rotation of the wheel 11a, detected by the rotation detection section, and outputs the signal to the CPU 21 of the computer 2.

The ball operation section 12 comprises a ball 12a which is rotatably turned in an arbitrary direction on the main unit of the input device 10, and a rotation detection section (not shown) for detecting the direction of the rotation and the degree of the rotation of the ball 12a. When the ball operation section 12 is operated by the operator, the input device 10 generates an operation signal indicating the direction of the rotation and the degree of the rotation of the ball 12a, detected by the rotation detection section, and outputs the signal to the CPU 21.

Examples of the rotation detection section possessed by the ball operation section 12 include one for detecting the degree of rotation of the ball 12a as the degree of rotation in the horizontal direction and in the vertical direction.

Furthermore, the key switch section 13 comprises a plurality of key switches. When one of the key switches is pressed, the input device 10 generates an operation signal corresponding to the pressed key switch, and outputs the signal to the CPU 21. This input device 10 is operated with the operator's non-favored hand.

Figure 2:
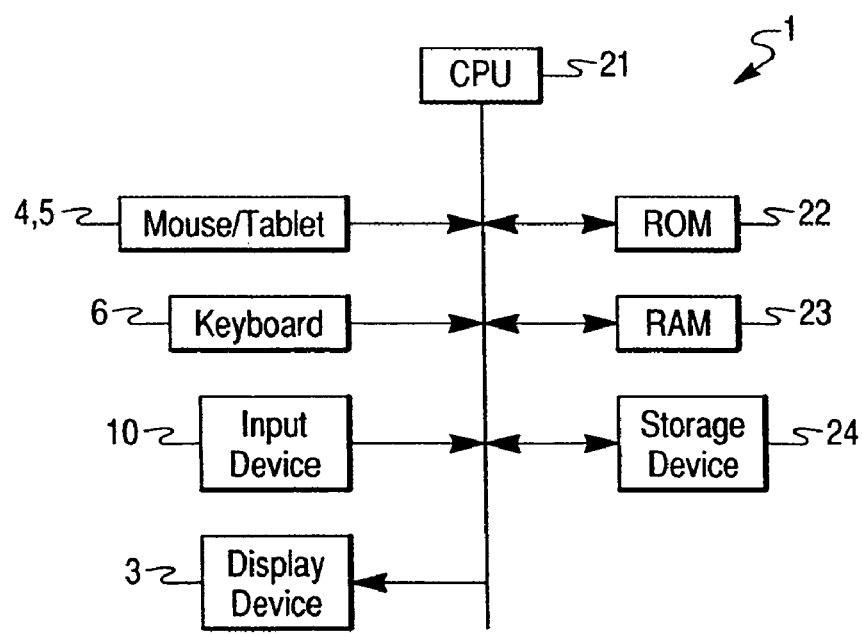
FIG. 2 depicts a block diagram showing the internal construction of a computer 2 shown in FIG. 1.

FIG. 2 is a block diagram showing the internal construction of the computer 2 shown in FIG. 1. FIG. 3 is a view conceptually showing the operation of the input system 1. The construction of the computer 2 will be described below with reference to FIGS. 2 and 3.

As shown in FIG. 2, the computer 2 comprises a CPU (Central Processing Unit) 21, a ROM (Read Only Memory) 22, a RAM (Random Access Memory) 23, a storage device 24, and a bus 25. The display device 3, the mouse 4, the tablet 5, the keyboard 6, and the input device 10 are connected to the bus 25 via the above described various interfaces.

When the computer 2 is started, the CPU 21 reads a system program stored in the ROM 22 or the storage device 24, loads the program into the work area within the RAM 23, and executes the program. Thus, each section of the computer 2 and each device connected to the computer 2 are reset to an initial state. Also, the CPU 21 determines whether or not each of the input devices of the mouse 4, the tablet 5, the keyboard 6, and the input device 10 are connected to the computer 2, and then reads and executes a device driver corresponding to the connected input device from among the device drivers 2a, 2b, 2c, and 2d (see FIG. 3) stored in the storage device 24, and waits for an input operation from each input device.

For example, when the CPU 21 detects that the mouse 4 is connected to the computer 2, the CPU 21 reads and executes the device driver 2c corresponding to the mouse 4, and waits for an input operation from the mouse 4. In a similar manner, when the tablet 5 is connected to the computer 2, the CPU 21 executes the device driver 2d; when the keyboard 6 is connected, the CPU 21 executes the device driver 2b; and when the input device 10 is connected, the CPU 21 executes the device driver 2a, and waits for an input operation.

When the mouse 4, the tablet 5, or the keyboard 6 is operated, the CPU 21 obtains input contents by the process of the device drivers 2c, 2d, or 2b which are being executed. The CPU 21 then reads and executes an application program 2f (see FIG. 3) stored in the storage device 24 in accordance with the obtained input contents.

When the input device 10 is operated while the application program 2f is being executed, and an operation signal is output from the input device 10, the CPU 21 obtains input contents in the input device 10 by the process of the device driver 2a, and executes a plug-in emulator 2e (see FIG. 3) on the basis of the obtained input contents in order to create emulation information. When executing the application program 2f, a process based on the emulation information is performed.

Furthermore, when executing the application program 2f, the CPU 21 creates display information of the screen to be displayed on the display device 3, and outputs the display information to the display device 3, so that the screen associated with the application program 2f is displayed on the screen of the display device 3.

The ROM 22 is comprised of a non-volatile semiconductor storage element, etc., and has stored therein system programs, etc., which are executed by the CPU 21, in a form readable by the CPU 21.

The RAM 23 provides a work area for temporarily holding programs processed by the CPU 21, and data associated with these programs, etc.

The storage device 24 comprises a storage medium (not shown) comprised of a magnetic or optical recording medium, a semiconductor storage element, etc. Various programs executed by the CPU 21, data associated with these programs, etc., are stored in this storage medium (not shown) in a form readable by the CPU 21.

Examples of the storage medium include portable media, such as CD-ROMs, and fixed media, such as hard disks. In addition, the storage medium may be a medium which is loaded into another computer connected to the computer 2 via a network and which can be accessed from the CPU 21 via the network.

FIG. 3 is a diagram conceptually showing the operation of the input system 1 with respect to an input operation of the mouse 4, the tablet 5, the keyboard 6, and the input device 10. All of the device drivers 2a, 2b, 2c, and 2d, the plug-in emulator 2e, and the application program 2f, shown in FIG. 3, are software executed by the CPU 21 by using the hardware resources of the input system 1.

The plug-in emulator 2e is stored in the storage device 24 in such a manner as to correspond to the application program 2f. When there are a plurality of application programs, plug-in emulators corresponding to the respective application programs may be stored in the storage device 24.

As shown in FIG. 3, when one of the mouse 4, the tablet 5, the keyboard 6, or the input device 10 is operated, an operation signal is output to the CPU 21. The CPU 21 executes the device drivers 2a, 2b, 2c, and 2d, and the plug-in emulator 2e as appropriate in order to obtain the input contents from the input operation signal.

For example, the operation signal output from the mouse 4 is processed by the device driver 2c, and the input contents in the mouse 4 are obtained from the operation signal. Furthermore, the device driver 2c creates movement information of the pointer corresponding to the input contents of the mouse 4 and information about the presence or absence of a button operation. A process by the application program 2f is performed on the basis of the created information.

For example, the operation signal output from the tablet 5 is processed by the device driver 2d, and the input contents in the tablet 5 are obtained on the basis of the operation signal. The device driver 2d creates movement information of the pointer corresponding to the input contents of the tablet 5 and information about the presence or absence of a button operation. Thereafter, a process by the application program 2f is performed on the basis of the created information.

Furthermore, the operation signal output to the CPU 21 from the keyboard 6 is processed by the device driver 2b, and the input contents in the keyboard 6 are obtained on the basis of the operation signal. Furthermore, the device driver 2b creates information indicating the key operation in the keyboard 6, and a process by the application program 2f is performed on the basis of the created information.

Figure 4A:
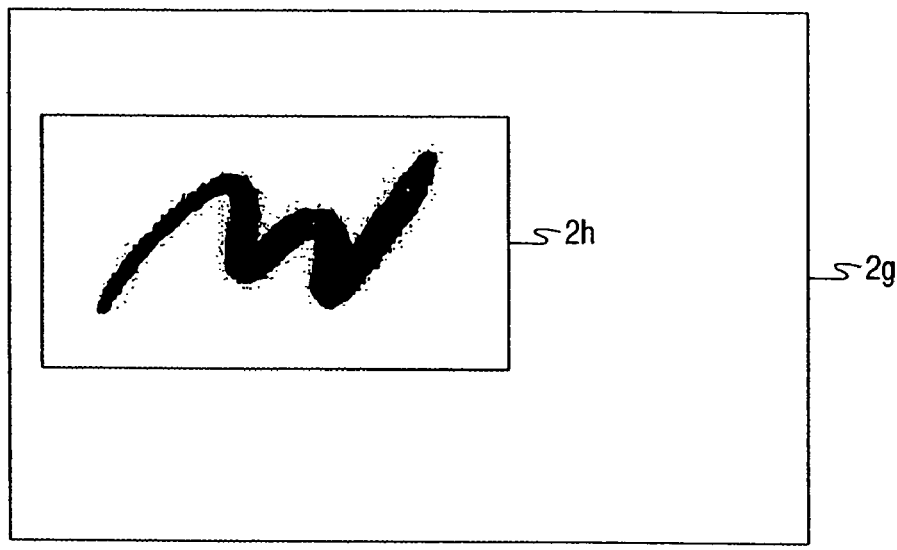
FIGS. 4A and 4B depict examples of an application program 2f executed by the computer 2 shown in FIG. 1.
Figure 4B:
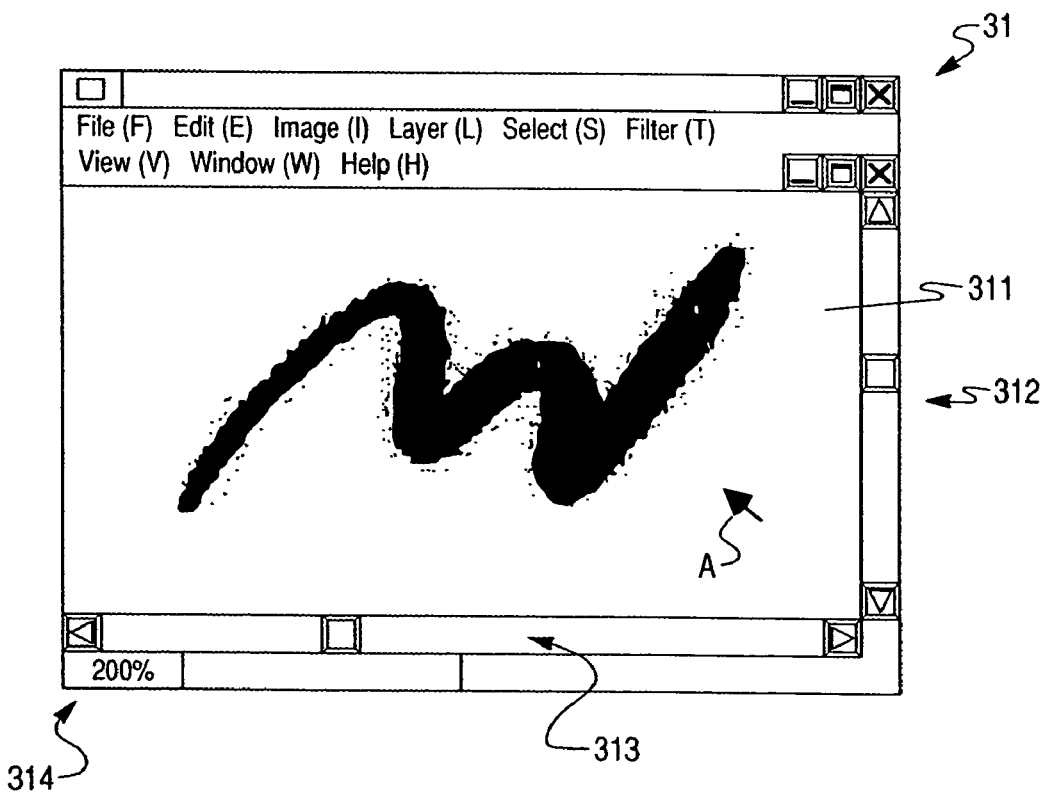

FIGS. 4A and 4B depict drawing processing by the application program 2f. FIG. 4A depicts a processing object area 2g as a processing object of the application program 2f and a display area 2h displayed on the display device 3 within the processing object area 2g. FIG. 4B depicts a drawing processing screen 31 on which the display area 2h is displayed.

When the application program 2f is to be executed, the processing object area 2g, such as that shown in FIG. 4A, is set as an object to be subjected to a drawing process. The operator may perform drawing in the processing object area 2g by executing the application program 2f.

The size of the processing object area 2g differs, depending upon the setting state in the application program 2f, and is set in accordance with the circumstances at printing time, such as the circumstances from the viewpoint of data management, etc. As a result, the size does not necessarily match the maximum display area size by the display device 3.

In the example shown in FIG. 4A, since the processing object area 2g is larger than the displayable size of the display device 3, the display area 2h is set in the processing object area 2g. The display area 2h is an area displayed by the display device 3 within the processing object area 2g, and the size thereof is varied according to the resolution and the display magnification ratio of the display screen of the display device 3, the layout on the screen, etc.

FIG. 4B depicts the state in which the display area 2h in the processing object area 2g is displayed on the display device 3. A processing object display section 311 in which the display area 2h is displayed is set forth in substantially the center of the drawing processing screen 31 shown in FIG. 4B.

Also, on the drawing processing screen 31, a pointer A, which is moved in response to an operation of the mouse 4 and/or the tablet 5, is displayed. The pointer A is moved and displayed on the screen in accordance with the pointer movement information created by the device drivers 2c and/or 2d when the mouse 4 and/or the tablet 5, is operated. This pointer A indicates the position of the operation object by the operator. For example, when the mouse 4 or the tablet 5 is operated in a state in which the pointer A is displayed in such a manner as to overlap an icon, a process associated with that icon is performed.

Furthermore, in the drawing processing screen 31, a vertical-scroll operation section 312 is disposed along the right edge of the processing object display section 311, and a horizontal-scroll operation section 313 is disposed along the lower end of the processing object display section 311.

The vertical-scroll operation section 312 and the horizontal-scroll operation section 313 are commonly called "scroll bars", and indicate the position of the display area 2h in the processing object area 2g shown in FIG. 4A.

The pointer A may be moved to the vertical-scroll operation section 312 or the horizontal-scroll operation section 313 in accordance with the pointer movement information created by the device drivers 2c or 2d. When the mouse 4 or the button of the tablet 5 is operated appropriately, the position of the display area 2h in the processing object area 2g varies.

For example, when the pointer A is positioned on the vertical-scroll operation section 312, and the button operation of the mouse 4 or the tablet 5 is performed, the display area 2h is moved in a vertical direction in the processing object area 2g, and the display in the processing object display section 311 is scrolled and displayed in the vertical direction. When the button operation of the mouse 4 or the tablet 5 is performed so that the pointer A is positioned on the horizontal-scroll operation section 313, the display area 2h is moved from side to side in the processing object area 2g, and the display in the processing object display section 311 is scrolled and displayed in the horizontal direction.

The process of moving the display area 2h in the processing object area 2g as a result of the operation performed on the vertical-scroll operation section 312 and the horizontal-scroll operation section 313 differs depending upon the specification of the application program 2f. Detailed processing procedures, etc., are not particularly limited. The processing procedure of varying the position of the processing object area 2g with respect to the display area 2h, or of varying the position of the display area 2h with respect to the processing object area 2g, is a design-related matter which is determined by the algorithm inside the program, and differs depending on the specification of the application program 2f. The present invention can be applied regardless of the specific processing procedure.

A magnification-ratio display section 314 is displayed in the lower left corner of the drawing processing screen 31. In the magnification-ratio display section 314, the magnification ratio is displayed when the display area 2h is displayed in the processing object display section 311. The magnification ratio may be changed by the operator as desired. As the display magnification ratio increases, the range in which the display area 2h occupies the processing object area 2g decreases, and vice versa. When the display area 2h becomes larger than the processing object area 2g as a result of changing display magnification ratio, and the entirety of the processing object area 2g is displayed in the processing object display section 311, the portion outside the processing object area 2g is displayed as a blank space.

When the application program 2f is executed, the drawing processing screen 31 shown in FIG. 4B is displayed by the display device 3. A drawing process in the processing object area 2g may then be performed. A scroll display of the processing object display section 311 is possible by operation of the mouse 4 and/or the tablet 5, based on the movement of the display area 2h in the processing object area 2g and a change in the display magnification ratio of the display area 2h in the processing object display section 311.

When an operation signal input from the keyboard 6 to the CPU 21 is processed by the device driver 2b, and the contents of the key operation in the keyboard 6 are created, various processes are performed. For example, an editing process for the object, such as images and characters drawn in the processing object area 2g, or a storing process of storing the processing object area 2g as a file, are performed based on the created information.

Another example includes operation of the "Ctrl" key and the "S" key, operated simultaneously on the keyboard 6. In the application program 2f, the processing object area 2g for the object of processing is saved as a file, or overwritten wherein it is saved into the file which has already been created. When the "Ctrl" key and the "S" key of the keyboard 6 are operated simultaneously, in the application program 2*f*, all the objects in the processing object area 2*g* are set to a selected state. Then, an editing process, such as collective movement, collective deletion, or collective copying of all the objects, can be performed.

When the "Ctrl" key and the "C" key of the keyboard 6 are operated simultaneously, the object in the selected state within the processing object area 2*g* is copied. When the "Ctrl" key and the "X" key of the keyboard 6 are operated simultaneously, the object in the selected state within the processing object area 2*g* is cut. When the "Ctrl" key and the "Y" key of the keyboard 6 are operated simultaneously, the object which has been copied or cut is pasted to a predetermined position within the processing object area 2*g*. When the "Ctrl" key and the "Z" key of the keyboard 6 are operated simultaneously, the editing process which was performed immediately before is cancelled, and the state before that editing process is restored. When the "Ctrl" key and the "D" key of the keyboard 6 are operated simultaneously, a font selection process for the purpose of inputting characters is started. When the "Ctrl" key and the "N" key of the keyboard 6 are operated simultaneously, a new processing object area 2*g* is created as a processing object for the application program 2*f*. When the "Alt" key and the "Esc" key of the keyboard 6 are operated simultaneously, and a plurality of application programs are being executed, including the application program 2*f*, the screen displayed on the display device 3 is changed from the screen of the application program 2*f* to the screen of another application program.

A process by the device driver 2*a* is then performed, with regard to the operation signal output from the input device 10 to the CPU 21. Then, a process by the plug-in emulator 2*e* is performed, so that emulation information compatible with the application program 2*f* is created.

Figure 5:
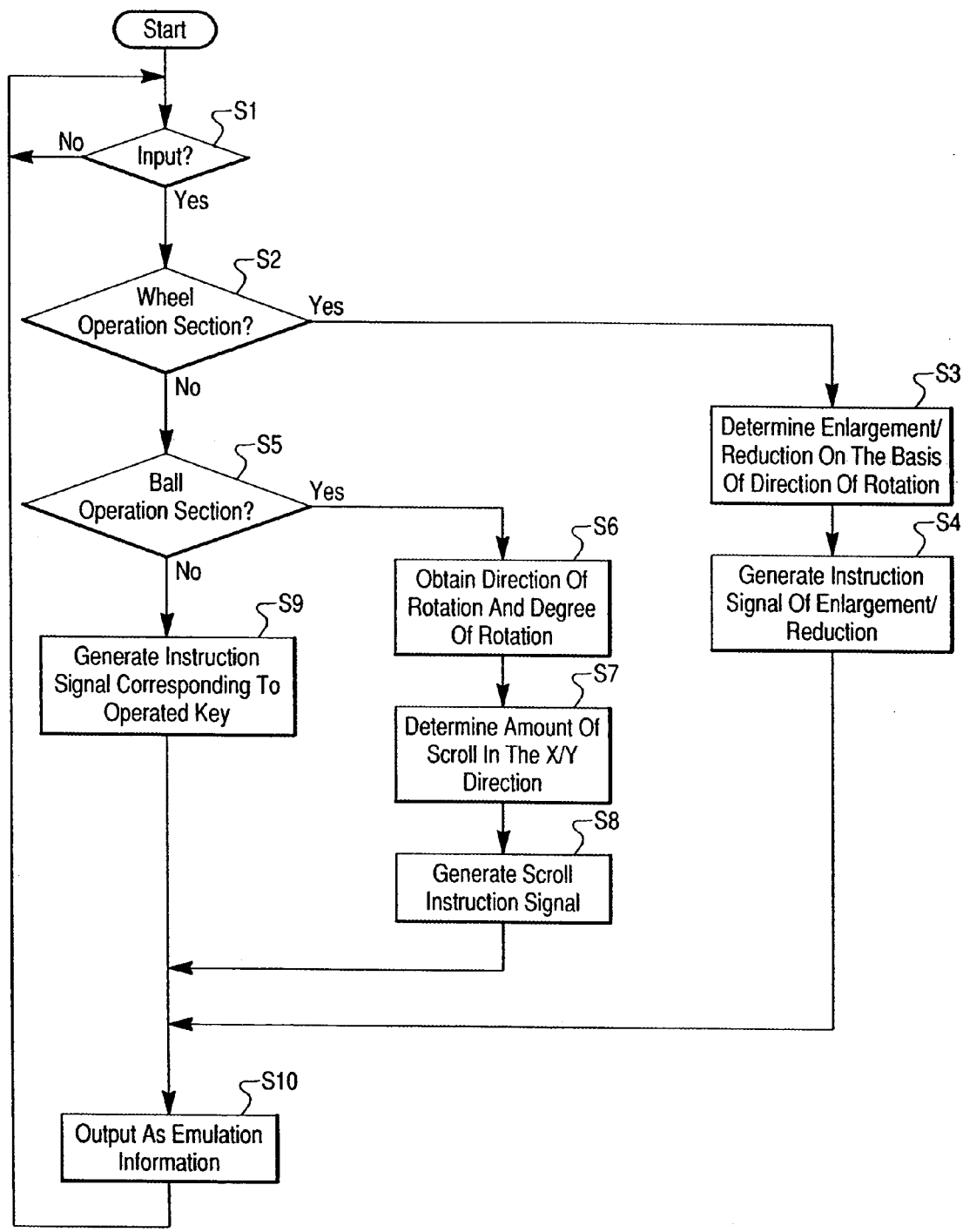
FIG. 5 is a flowchart showing the operation of the claimed invention when a plug-in emulator 2e is executed by a CPU 21 shown in FIG. 2.

FIG. 5 is a flowchart showing a process when the plug-in emulator 2*e* is executed by the CPU 21. When the plug-in emulator 2*e* is executed, the CPU 21 first determines the presence or absence of an operation in the wheel operation section 11 of the input device 10 on the basis of the processing result by the device driver 2*a* (step S1).

When the wheel operation section 11 is operated (Yes in step S1), based on the processing result of the device driver 2*a*, the CPU 21 determines whether the instruction by the operator is an enlargement or a reduction on the basis of the direction of the rotation of the wheel 11*a* on the wheel operation section 11 (step S2).

Specifically, the CPU 21 extracts the detection result by the rotation detection section (not shown) based on the operation signal output from the input device 10, which is processed by the device driver 2*a*. The direction of the wheel 11*a* of the wheel operation section 11 is then determined. When the direction of rotation of the wheel 11*a* is in the forward direction, the operator has instructed an enlargement. When the direction of rotation of the wheel 11*a* is in the backward direction, the operator has instructed a reduction.

Next, the CPU 21 generates an instruction signal instructing the application program 2*f* to enlarge or reduce the display in the processing object display section 311, in accordance with the instruction contents determined in step S2 (step S3). The process then proceeds to step S4.

For example, in step S3, a predetermined command for the application program 2*f* for instructing enlargement or reduction of the display of the processing object display section 311 may be generated as an instruction signal. Alternatively, a signal is generated which is equivalent to a predetermined key operation in the keyboard 6, or a signal is generated by another input device for instructing the enlargement or reduction of the display.

When the wheel operation section 11 is not operated (No in step S1), the CPU 21 does not perform the processes of steps S2 and S3, and the process directly proceeds to step S4.

In step S4, the CPU 21 determines whether or not the ball operation section 12 is operated. If the ball operation section 12 is operated (Yes in step S4), the CPU 21 determines the direction of rotation and the degree of rotation of the ball 12*a* of the ball operation section 12 on the basis of the processing results by the device driver 2*a* (step S5).

Then, the CPU 21 determines the amount of scrolling in the X and the Y direction on the basis of the direction of the rotation and the degree of the rotation of the ball 12*a* (step S6), and generates an instruction signal instructing the application program 2*f* to scroll the display of the processing object display section 311 (step S7). The process then proceeds to step S8.

For example, in step S7, a predetermined command for the application program 2*f* for instructing the scrolling of the display of the processing object display section 311 may be generated as an instruction signal. Alternatively, a signal is generated which is equivalent to a predetermined key operation in the keyboard 6, or a signal is generated which is equivalent to the operation time of another input device for instructing the scrolling of the screen display.

If the ball operation section 12 is not operated in the input device 10 (No in step S5), the CPU 21 does not perform the processes of steps S5 to S7, and the process proceeds to step S8.

In step S8, the CPU 21 obtains the operation contents in the key switch section 13 on the basis of the processing results of the device driver 2*a*, and generates an instruction signal corresponding to the operated key in the key switch section 13. The process then proceeds to step S9.

In step S9, the CPU 21 creates emulation information in accordance with the instruction signals generated in steps S3, S7, and S9, outputs the information to the work area of the RAM 23 whereby the information is stored temporarily, and executes the application program 2*f* where appropriate. The process then returns to step S1.

As a result of executing the plug-in emulator 2*e*, when the wheel 11*a* of the wheel operation section 11 of the input device 10 is rotated in the forward direction, the display of the processing object display section 311 (FIG. 4B) is enlarged. When the wheel 11*a* is rotated in the backward direction, the display is reduced. In the ball operation section 12, when the ball 12*a* is rotated an arbitrary amount in a desired direction, the display of the processing object display section 311 is scrolled on the basis of the direction of the rotation and the degree of the rotation.

Therefore, it is possible for the operator to change the display magnification ratio and to perform scrolling in the processing object display section 311 by operating the input device 10 with the operator's non-favored hand. Thus, operation of the mouse 4 and the tablet 5 with the operator's favored hand is supplemented by operations performed with the operator's non-favored hand. Both hands are efficiently used in cooperation, which improves overall operation efficiency.

Also, the emulation information created in step S9 may be instruction signals themselves, which have been generated in steps S3, S7, and S8, or new emulation information may be created from a plurality of instruction signals which satisfy specific conditions.

Specifically, in the operation of the plug-in emulator 2*e* shown in FIG. 5, even if a plurality of operation sections, such as the wheel operation section 11, the ball operation section 12 and the key switch section 13, are operated simultaneously, it is possible to obtain those operation contents and create the corresponding emulation information. Therefore, it is also possible to instruct the application program 2f to perform a special process that corresponds to simultaneous operations in a plurality of operation sections. For example, a special screen switching process may be instructed that corresponds to the simultaneous operations of a predetermined key of the key switch section 13 and the wheel 11a of the wheel operation section 11.

In the process shown in step S9 of FIG. 5, when the instruction signal generated in step S3 and the instruction signal generated in step S8 are a specific combination, specific emulation information is created. This information may then be output to the application program 2f.

FIG. 6 is a table showing examples of instruction signals generated which correspond to the keys provided in the key switch section 13 in step S8 of FIG. 5. FIG. 6 depicts an example in which 10 keys are displayed in the key switch section 13. Note that FIG. 6 is only an example, and the arrangement may differ depending on the construction of the input system 1 and the type of application program 2f.

As depicted in FIG. 6, the key switch section 13 has 10 keys 13a, 13b, 13c, 13d, 13e, 13f, 13g, 13h, 13i, and 13j. Key 13a, labeled as "Store", provides a setting in which an instruction signal is generated which is similar to that of the "Ctrl" key and the "S" key of the keyboard 6 operated simultaneously.

Similarly, key 13b, labeled as "Select All", provides a setting in which an instruction signal is generated which is similar to that of the "Ctrl" key and the "A" key of the keyboard 6 operated simultaneously. For the key 13c labeled as "Copy", an instruction signal is generated which corresponds to the "Ctrl" key and the "C" key of the keyboard 6 operated simultaneously. For the key 13d labeled as "Cut", an instruction signal is generated which corresponds to the simultaneous operation of the "Ctrl" key and the "X" key of the keyboard 6. For the key 13e labeled as "Paste", an instruction signal is generated which corresponds to the simultaneous operation of the "Ctrl" key and the "Y" key of the keyboard 6. For the key 13f labeled as "Undo", an instruction signal is generated which corresponds to the simultaneous operation of the "Ctrl" key and the "Z" key of the keyboard 6. For the key 13g labeled as "Font Setting", an instruction signal is generated which corresponds to the simultaneous operation of the "Ctrl" key and the "D" key of the keyboard 6. For the key 13h labeled as "Create Newly", an instruction signal is generated which corresponds to the simultaneous operation of the "Ctrl" key and the "N" key of the keyboard 6. For the key 13i labeled as "Switch Display", an instruction signal is generated which corresponds to the simultaneous operation of the "Alt" key and the "Esc" key of the keyboard 6. For the key 13j labeled as "On/Off", an instruction signal instructing On/Off of an input from the input device 10 is generated.

For example, when the key 13a is operated, in the process shown in step S8 of FIG. 5, the instruction signal generated emulates the effect of simultaneously operating the "Ctrl" key and the "S" key of the keyboard 6. Emulation information is created in step S9 (FIG. 5) on the basis of this instruction signal, and a process by the application program 2f is performed. The operations of the keys 13a, 13b, 13c, 13d, 13e, 13f, 13g, 13h, and 13i are equivalent to the simultaneous operation of a plurality of keys possessed by the keyboard 6 while the application program 2f is being executed.

Consequently, if one of the keys 13a, 13b, 13c, 13d, 13e, 13f, 13g, 13h, and 13i is operated, an instruction input is generated which is equivalent to the simultaneous operation of a plurality of keys in the keyboard 6. As a result, it is possible for the operator to operate a key with his non-favored hand to make an instruction input similar to an instruction input requiring a plurality of keys of the keyboard 6 operated simultaneously using both hands.

If the operator operates the keyboard 6 conventionally with the non-favored hand, and the mouse 4 or the tablet 5 with the favored hand, it is necessary to move the favored hand away from the mouse 4 or the tablet 5 to perform the above described instruction inputs. However, operation of the key switch section 13 of the input device 10 with the non-favored hand allows the operator to perform an operation equivalent to the operation of the keyboard 6 without moving the favored hand away from the mouse 4 or the tablet 5. Furthermore, the operation in the key switch section 13 can easily be performed with the non-favored hand given only one key switch must be pressed. Thus, the risk of misoperation is minimized.

In addition, operation of the key 13j, the On/Off of the input device 10, may be used to prevent misoperation. If an application program does not correspond to the operation of the input device 10, the input device 10 may be deactivated using key 13j to prevent misoperation. If the application program, in which the corresponding plug-in emulator 2e provided is executed, corresponds to the input device 10, operation of key 13j activates the input device 10 to ON, and operation using the input device 10 becomes possible again.

In the example shown in FIG. 6, an instruction signal is generated similar to that generated when one key, or a plurality of keys, on the keyboard 6 is operated, corresponding to keys 13a, 13b, 13c, 13d, 13e, 13f, 13g, 13h, and 13i. However, the present invention is not limited to same, and commands specific to an application program 2f may be created. Furthermore, an instruction signal similar to an instruction signal corresponding to operation of the mouse 4 or the tablet 5 may be generated. Furthermore, key 13j may be displayed in the main unit of the input device 10 separately from the other keys.

Figure 7A:
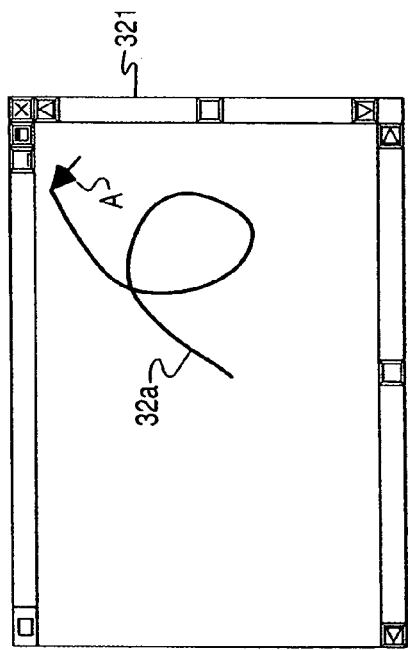
FIGS. 7A, 7B, 7C, and 7D, depict examples of a screen displayed on the display device 3 in such a manner as to correspond to a series of input operations in the input system 1 shown in FIG. 1.
Figure 7B:
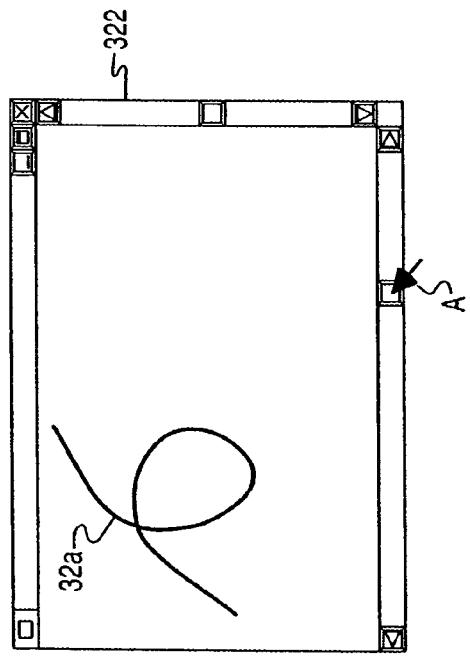
Figure 7C:
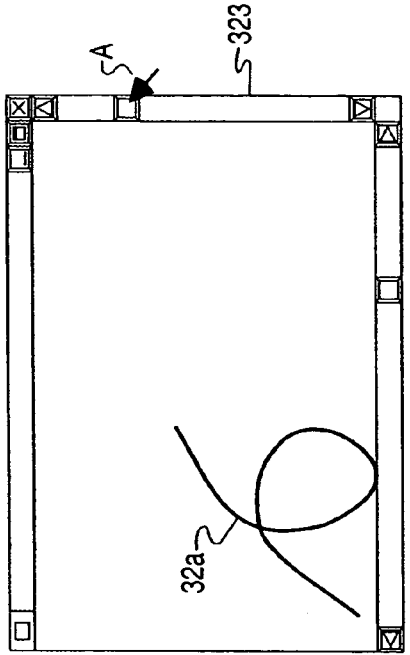
Figure 7D:
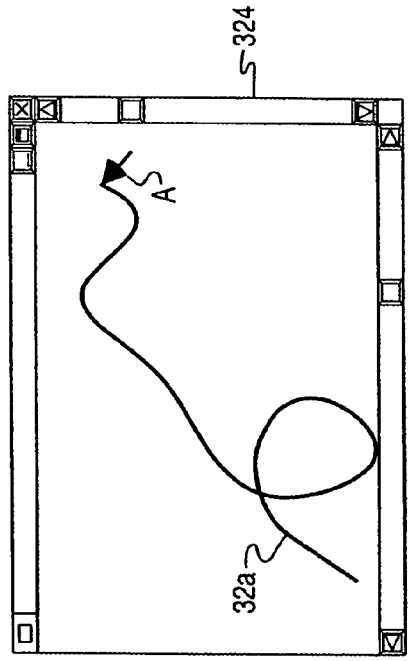
Figure 8C:
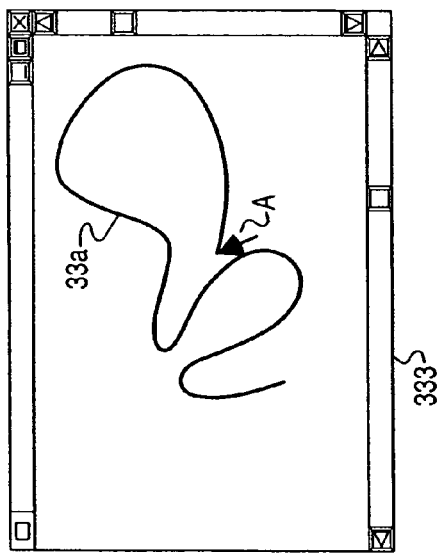
Figure 8D:
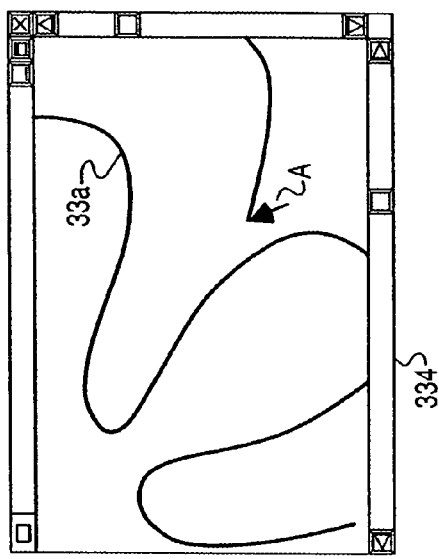
Figure 8A:
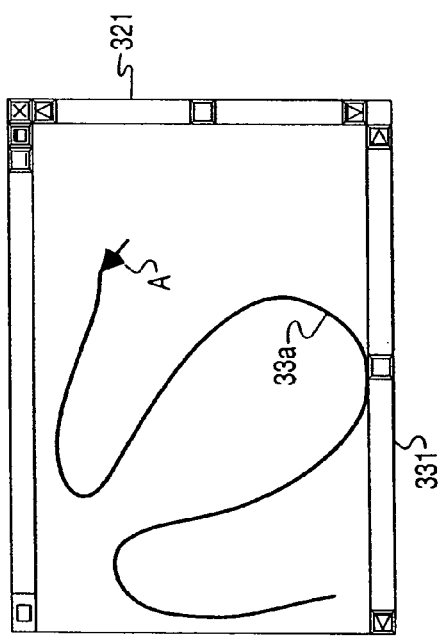
Figure 8B:
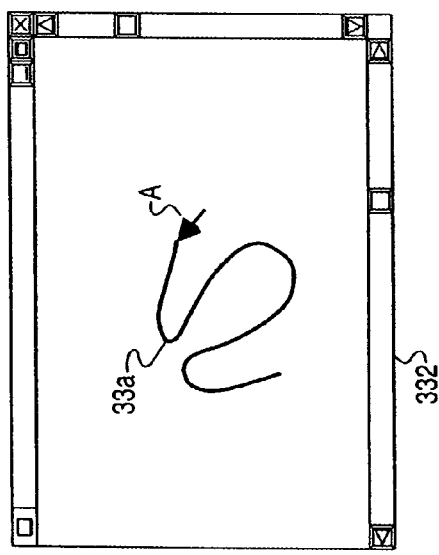

FIGS. 7A, 7B, 7C, and 7D, and FIGS. 8A, 8B, 8C, 8D, and 8E depict examples of screens displayed on the display device 3 when the application program 2f is executed. FIG. 7A depicts drawing processing screen 321. FIG. 7B depicts drawing processing screen 322. FIG. 7C depicts drawing processing screen 323. FIG. 7D depicts drawing processing screen 324. FIG. 8A depicts drawing processing screen 331. FIG. 8B depicts drawing processing screen 332. FIG. 8C depicts drawing processing screen 333. FIG. 8D depicts drawing processing screen 334. FIG. 8E depicts drawing processing screen 335.

Drawing processing screen 321 shown in FIG. 7A is a screen in a state in which the application program 2f for performing a drawing process is being executed. On drawing processing screen 321, the pointer A, operated by the mouse 4 and/or the tablet 5, is displayed. An object 32a is drawn by a pointer movement operation and a button operation using the mouse 4 and/or the tablet 5.

Drawing processing screen 322 shown in FIG. 7B depicts an object 32a displayed on the drawing processing screen 321 which has been moved to the left side of the screen. When only the mouse 4 and/or the tablet 5 are used to perform an operation, changing the display state of the object 32a from the drawing processing screen 321 to the drawing processing screen 322 requires a button operation after the pointer A has been moved onto the scroll bar for instructing screen scrolling in the vertical direction, which is provided in the lower portion of the screen of the drawing processing screen 322. For this reason, the pointer A must be moved away from the object 32a. This is inefficient. However, if the input device 10 is used, by rotating the ball 12a (FIG. 1) of the ball operation section 12, the object 32a can be moved without moving the pointer A.

On the drawing processing screen 323 shown in FIG. 7C, the object 32a has been moved downward from the position displayed on the drawing processing screen 322. If only the mouse 4 and the tablet 5 are used to perform this operation, a button operation must be performed after the pointer A is moved onto the scroll bar by which a vertical screen scroll is instructed in the vertical direction, which is provided on the right side of the screen of the drawing processing screen 322. However, if the input device 10 is used, by rotating the ball 12a, the object 32a can be moved without moving the pointer A.

On the drawing processing screen 324 shown in FIG. 7D, the pointer A is moved to the end point of the object 32a, and the object 32a is continuously drawn toward the right upper portion of the screen from the state shown in FIGS. 7A to 7C. More specifically, in a case where the object 32a shown in FIG. 7A is drawn and drawing is continued toward the right upper portion, it is necessary to move the object 32a toward the left side as shown on the drawing processing screen 322 of FIG. 7B. Furthermore, it is necessary to move the object 32a toward the lower portion as shown on the drawing processing screen 323 of FIG. 7C.

If the above described series of movements of the object 32a is performed by using only the mouse 4 and/or the tablet 5, the pointer A must be moved away from the object 32a, moved to the scroll bar in the lower portion of the screen, and moved to the scroll bar on the right side of the screen in sequence. However, if the input device 10 is used, the object 32a can be moved by only rotating the ball 12a without performing the operation of moving the pointer A.

Therefore, operations relating to the movement of the object 32a may be performed by using the input device 10 with the non-favored hand, while the object 32a is being drawn using the pointer A with the favored hand. The favored hand may be used exclusively to perform only the drawing operation of the object 32a. As a result, it is possible for the operator to quickly and smoothly perform an operation while both hands are used efficiently.

The drawing processing screen 331 depicted in FIG. 8A is a screen in a state in which the application program 2f for executing a drawing process is being executed. Drawing processing screen 331 depicts the pointer A, operated by the mouse 4 and/or the tablet 5, and the object 33a drawn by the pointer movement operation and the button operation by the mouse 4 and/or the tablet 5.

Drawing processing screen 332, shown in FIG. 8B, depicts the object 33a displayed and reduced on the drawing processing screen 331. In order to change the display state of the object 33a from drawing processing screen 331 to drawing processing screen 332, the display magnification ratio is changed. Examples of this operation include an operation of moving the pointer A to an icon (not shown) for menu operation, and an operation of inputting a command for changing the display magnification ratio by the key operation of the keyboard 6. In either example, the drawing of the object 33a is stopped in order to move the pointer A to the icon, or the favored hand is moved to the keyboard 6 in order to operate the keyboard 6. However, if the input device 10 is used, by rotating the wheel 11a (FIG. 1) possessed by the wheel operation section 11, the display magnification ratio can be changed.

On the drawing processing screen 333 shown in FIG. 8C, the drawing of the object 33a is continued, and furthermore, on the drawing processing screen 334 shown in FIG. 8D, the object 33a displayed is expanded.

In order to change the display state of the object 33a from drawing processing screen 333 to drawing processing screen 334, the display magnification ratio is changed. As described above, the operation of moving the pointer A and the operation of the keyboard 6 are required. However, if the input device 10 is used the display magnification ratio can be changed by rotating the wheel 11a only.

On the drawing processing screen 335 shown in FIG. 8E, drawing of the object 33a is continued from the state shown on the drawing processing screen 334 of FIG. 8D. When drawing is continued from the state shown on the drawing processing screen 331 of FIG. 8A to the state shown on the drawing processing screen 333 of FIG. 8C and then to the state shown on the drawing processing screen 335 of FIG. 8E, the display magnification ratio of the object 33a must be changed two times.

If the above-described operations are performed without using the input device 10, a series of operations must be performed at least twice, requiring that the pointer A be moved away from the object 33a, and/or the favored hand be moved to the keyboard 6. However, if the input device 10 is used, by operating the wheel 11a with the non-favored hand, the display magnification ratio can be changed, while simultaneously using the favored hand for drawing of the object 33a. Therefore, a series of operations from the state shown on the drawing processing screen 331 of FIG. 8A to the state shown on the drawing processing screen 335 of FIG. 8E may be easily performed by using both hands in cooperation.

In the above-described first embodiment, input devices in the computer 2 are provided, including the mouse 4, the tablet 5, the keyboard 6, and the input device 10. However, the present invention is not limited to this construction. Other input devices may be used, such as a touch pad in a notebook-sized computer, and/or a mouse provided with a scroll wheel. Furthermore, the construction of the disclosed input devices may, such as the wheel size 11a and the ball 12a of the input device 10, or the number of keys of the key switch section 13, and remain within the scope of this invention. In addition, although the above-described first embodiment application program 2f is an application program for executing a drawing process, other application programs may be used.

A second embodiment of the present invention provides for an input system 1 as described in the first embodiment, with an application program differing from a drawing process program 2f. Therefore, the construction of the second embodiment, excluding the application program 2f, is the same as that described in the first embodiment. Accordingly, the illustrations and the descriptions of the construction in the second embodiment are omitted.

In the second embodiment, the application program 2f is a Web browser for displaying a Web page written by HTML (Hyper Text Markup Language), etc. The Web page displayed by the application program 2f may contain a program written by CGI (Common Gateway Interface), JAVA, etc.

According to a plug-in emulator 2e corresponding to the application program 2f as a Web browser, when the wheel 11a possessed by the wheel operation section 11 of the input device 10 is operated, an instruction signal indicating the change of character size during the Web page display time is generated according to the direction of the rotation of the wheel 11a. This signal is then output as an emulation signal to the application program 2f.

Figure 9A:
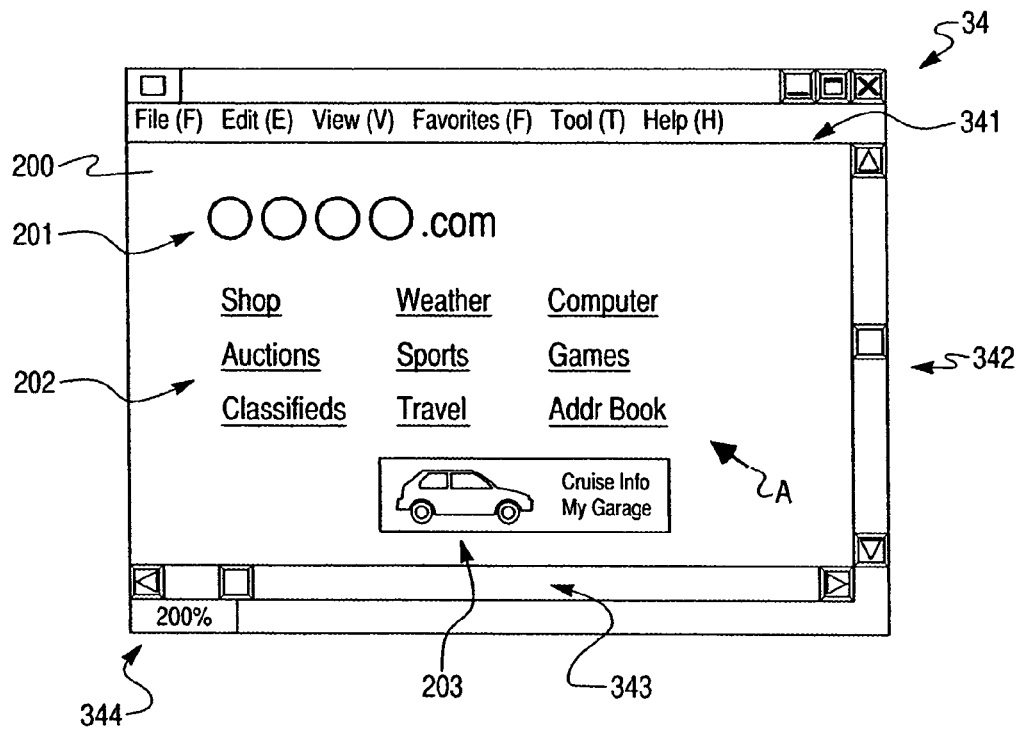
FIGS. 9A and 9B depict examples of a display screen in a case where Web browser software is executed by the computer 2 in the input system 1 according to a second embodiment of the present invention.
Figure 9B:
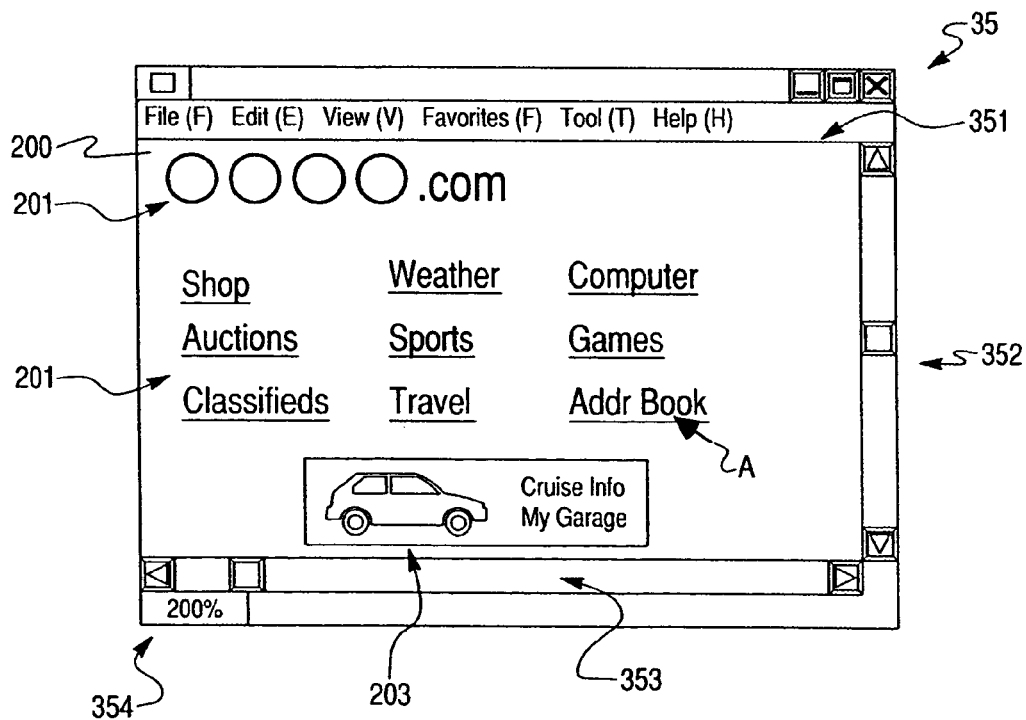

Examples of operating states of this application program 2f are shown in FIGS. 9A and 9B. FIGS. 9A and 9B depict examples of a display screen when using the Web browser application program 2 according to a second embodiment of the present invention. FIG. 9A depicts an example of a browser screen 34 in an initial state of the display screen. FIG. 9B depicts the same browser screen 35, following a change in display size of character objects.

When the Web browser application program 2f is executed, the browser screen 34 shown in FIG. 9A is displayed in the display device 3, and a Web page 200 is shown. On the browser screen 34, all or part of the Web page 200 is displayed.

In substantially the center of the browser screen 34, a processing object display section 341 is displayed, as well as a vertical-scroll operation section 342 for scrolling the Web page 200 in the vertical direction in the processing object display section 341, displayed on the right side of the processing object display section 341. A horizontal-scroll operation section 343 for scrolling the Web page 200 in the horizontal direction is displayed in the lower portion of the processing object display section 341. A magnification-ratio display section 344 for displaying the display magnification ratio of the Web page 200 in the processing object display section 341 is displayed in the left corner portion of the browser screen 34. The pointer A, which is operated by the mouse 4 and/or the tablet 5, is also displayed on the browser screen 34.

On the browser screen 34, the pointer A can be moved to the vertical-scroll operation section 342 or the horizontal-scroll operation section 343 so that the Web page 200 within the processing object display section 341 is scrolled. It is also possible to move the pointer A to an icon (not shown) for the menu screen, so that the display magnification ratio displayed on the magnification-ratio display section 344 is changed.

The Web page 200 displayed on the processing object display section 341 contains character objects 201 and 202, and an image object 203. The character objects 201 and 202 are contained as text data in the Web page 200 written by HTML, and the image object 203 is set as image data.

On the browser screen 34 shown in FIG. 9A, a process for expanding the character size is depicted in FIG. 9B. FIG. 9B depicts a browser screen 35 in which the character size is expanded, and in substantially the center thereof, a processing object display section 351 is displayed. On the right side of the processing object display section 351, a vertical-scroll operation section 352 for scrolling the Web page 200 in the vertical direction in the processing object display section 351 is displayed. In the lower portion of the processing object display section 351, a horizontal-scroll operation section 353 for scrolling the Web page 200 in the horizontal direction in the processing object display section 351 is displayed. In the left corner portion of the browser screen 35, a magnification-ratio display section 354 for displaying the display magnification ratio of the Web page 200 in the processing object display section 351 is displayed.

On the browser screen 35, both of the character objects 201 and 202 are displayed larger than those on the browser screen 34. However, in the Web page 200, the range in which they are displayed on the processing object display section 341 of the browser screen 34 is the same as the range in which they are displayed on the processing object display section 351 of the browser screen 35. The size of image object 203 is the same.

The character size of the browser screen 34 and the browser screen 35 differs when the Web page 200 is displayed. In this case, the range in which the Web page 200 is displayed on the processing object display section 341, and the range in which the Web page 200 is displayed on the processing object display section 351, are not changed to a state in which the character objects 201 and 202 can be completely displayed.

Also, the display magnification ratio at which the Web page 200 is displayed on the magnification-ratio display section 344, and the display magnification ratio at which the Web page 200 is displayed on the magnification-ratio display section 354, are the same.

In this second embodiment, including the plug-in emulator 2e corresponding to the application program 2f as a Web browser, software is used for generating an instruction signal which changes the character size in response to an operation of the wheel operation section 11 (FIG. 1). Therefore, in order to change the display state from browser screen 34 to browser screen 35 while the application program 2f is being executed, the operator must only perform an operation for rotating the wheel 11a (FIG. 1).

In order to select and specify a link in a Web page, pointing devices such as the mouse 4 and the tablet 5 are conventionally used. Such conventional operation requires that the operator press an icon for menu operation, etc., by using a pointing device, at which time the operation must be stopped. Further, this series of operations is normally performed with only the favored hand.

However, if the input device 10 is used, character size can easily be changed by operating the wheel 11a of the wheel operation section 11. Thus, character size can be changed with the non-favored hand while operating the pointing device with the favored hand. The operator can use both hands in cooperation in order to efficiently and smoothly perform the operation.

Although the second embodiment describes the change in character size of character objects 201 and 202 during the display time of the Web page 200 using the operation of the input device 10, the present invention is not limited to same. For example, the size of the image object 203 can also be changed at the same time.

While the present invention has been described with reference to the presently considered, preferred embodiments, it is understood that the invention is not limited to the disclosed embodiments. The invention is intended to cover various modifications and equivalent arrangements included within the spirit and scope of the claims. The scope of the claims is to be accorded the broadest interpretation so as to encompass all such modifications and equivalent structures and functions.

What is claimed is:

1. A method for instructing a change in a display state of a processing object area on a display screen connected to a computer, to which a first input device for specifying a position on the display screen and a second input device differing from the first input device, are connected, comprising the steps of:

executing a plug-in emulator configured to create emulation information based at least in part on a first operation signal from the first input device and a second operation signal from the second input device;

executing an application program in accordance with the emulation information, displaying the processing object area of the application program on the display screen; and executing a display state changing process for changing the display state of the processing object area on the display screen in response to an operation of the second input device.

2. The method of claim 1, further comprising: instructing a change of a relative position of the processing object area with respect to the display screen in response to an operation of the second input device.

3. The method of claim 1, further comprising: instructing a change of a display magnification ratio of the processing object area displayed on the display screen in response to an operation of the second input device.

4. The method of claim 1, further comprising: instructing a change of a display size of an object contained within the processing object area displayed on the display screen in response to an operation of the second input device.

5. The method of claim 1, further comprising:
instructing an editing process for the processing object area displayed on the display screen in response to an operation of the second input device.

6. The method of claim 1, further comprising:
generating an instruction signal compatible with the application program executed by the computer, wherein the instruction signal corresponds to an operation of the second input device.

7. A computer system, comprising:
a computer;
a display screen connected to the computer, wherein a processing object area of an application program usable by the computer is displayed on the display screen;
a first input device connected to the computer, the first input device for specifying a position on the display screen;
a second input device connected to the computer, the second input device differing from the first input device; and
an instruction set comprising a plug-in emulator for instructing a change in a display state of the processing object area of the application program on the display screen in response to an operation of the second input device.

8. The method of claim 1, wherein
the first input device comprises a digitizer and an associated stylus, and
the second input device comprises a common housing including a first input component, a second input component, and a third input component,
the first input component comprising a wheel;
the second input component comprising an input ball; and
the third input component comprising a key input portion.

9. The system of claim 7, wherein
the first input device comprises a digitizer and an associated stylus, and
the second input device comprises a common housing including a first input component, a second input component, and a third input component,
the first input component comprising a wheel;
the second input component comprising an input ball; and
the third input component comprising a key input portion.

* * * * *